United States Patent [19]

Dewitz et al.

[11] Patent Number: 4,941,779
[45] Date of Patent: Jul. 17, 1990

[54] COMPARTMENTED GAS INJECTION DEVICE

[75] Inventors: Thomas S. Dewitz, Houston; James A. Salter, Katy; James J. McCusker, Houston, all of Tex.; Andrew M. Scott; Hendricus A. Dirkse, both of Amsterdam, Netherlands

[73] Assignee: Shell Oil Company, Houston, Tex.

[21] Appl. No.: 355,860

[22] Filed: May 18, 1989

Related U.S. Application Data

[63] Continuation of Ser. No. 98,161, Sep. 18, 1987, abandoned.

[51] Int. Cl.$^5$ .............................................. B65G 53/38
[52] U.S. Cl. .................................... 406/138; 406/90; 406/91; 406/136; 406/137; 222/195
[58] Field of Search ................. 222/195; 406/12, 14, 406/16, 19, 85, 89, 90, 91, 108, 118, 119, 122, 123, 136, 137, 138

[56] References Cited

U.S. PATENT DOCUMENTS

| 2,170,258 | 8/1939 | Borch | 406/136 |
| 2,686,083 | 8/1954 | Hampton et al. | 406/136 |
| 3,639,007 | 2/1972 | Dare et al. | 406/91 |
| 3,713,564 | 1/1973 | Cottrell | 222/195 |
| 4,059,311 | 11/1977 | Spitzer et al. | 406/90 |
| 4,086,706 | 5/1978 | Lesk et al. | 406/91 |
| 4,338,187 | 7/1982 | Gartside et al. | 406/137 |
| 4,413,758 | 11/1983 | Walters | 222/195 |
| 4,453,865 | 6/1984 | Norton | 406/137 |
| 4,693,189 | 9/1987 | Powers | 406/137 |

FOREIGN PATENT DOCUMENTS

| 2740961 | 3/1978 | Fed. Rep. of Germany . |
| 14793 | 4/1981 | Fed. Rep. of Germany . |
| 1280116 | 11/1961 | France . |
| 854866 | 11/1960 | United Kingdom ............ 406/90 |

*Primary Examiner*—Sherman D. Basinger
*Assistant Examiner*—Thomas J. Brahan

[57] ABSTRACT

Injection of gas into a bed of solids contained in a hopper is compartmentalized to allow independent control of gas to be vented upward and gas and solids to be discharged.

22 Claims, 2 Drawing Sheets

COMPARTMENTED GAS INJECTION DEVICE

This is a continuation of application Ser. No. 098,161 filed Sept. 18, 1987, now abandoned.

RELATED APPLICATIONS

This invention is related to Assignee's copending patent application Ser. No. 098,152.

BACKGROUND OF THE INVENTION

Conventional coal feed systems using gravity flow of solids, such as coal feed to coal-filed boilers, can tolerate major fluctuations in the coal mass flow rate and suspension density.

Various devices have been built for discharging substances which tend to flow easily by gravity, such as grain. While devices such as those disclosed in U.S. Pat. Nos. 3,289,396; 3,367,724; 4,529,336; 3,424,352; and 4,067,623 are concerned with providing "efficient discharge" of particulate materials from bulk storage tanks and avoiding bridging and incomplete discharging from such tanks, these devices do not maintain a uniform mass flow rate of particulate solids and gas mixture discharged in a uniform manner to a receiving reactor as does the present invention.

The present invention is directed to overcoming this problem in the art.

Applicants are not aware of any prior art which, in their judgment as persons skilled in this particular art, would anticipate or render obvious the present invention. However, for the purpose of fully developing the background of the invention, and establishing the state of requisite art, the following art is set forth: 4,482,275; 3,367,724; 4,067,623; 3,424,352; 4,529,336; Re. 24,716 (2,794,686); 3,007,744; 2,568,379; 2,400,194; 2,115,023; 3,230,016; 3,285,739; 3,289,296; 4,381,924; 3,479,093; 3,121,593; 3,159,432; 2,499,766; 3,411,832; 3,720,351; 2,806,781; 3,822,919; 699,405; 3,994,702; 4,018,588; 3,001,829; 2,715,551; 2,631,759; Japanese patent Nos. 98,030; 102,431; and 107,316; "Monitor Aeration Devices", Monitor Manufacturing Company, Elburn, Ill. 60119.

SUMMARY OF THE INVENTION

The primary purpose of the present invention relates to maintaining a uniform mass flow rate of particulate solids and gas mixture discharged to a receiving reactor. In particular, this invention relates to pulverized coal discharged to a gasifier for the manufacture of synthesis gas.

Preferably, such an apparatus includes: means for introducing the mixture into a first containing means having converging walls forming a portion made of porous material having at least one port formed at the apex thereof for discharging the mixture therefrom, means for isolating areas outside the porous material portion of the first containing means to form at least two substantially closed compartments, means for selectively injecting gaseous fluid under pressure into each of the compartments, and means for discharging the particulate solids from the first containing means.

Preferably, a method for controlling mass flow rate of solids to a reactor includes: introducing the mixture into a first containing means having converging walls forming a portion made of porous material having at least one port formed at the apex thereof for discharging the mixture therefrom, isolating areas outside the porous material portion of the first containing means to form at least two substantially closed compartments, selectively injecting gaseous fluid under pressure into each of the compartments, and discharging the particulate solids from the first containing means.

The various features of novelty which characterize the invention are pointed out with particularity in the claims forming a part of this disclosure. For a better understanding of this invention, its operating advantages and specific object obtained by its uses, reference may be made to the accompanying drawings and descriptive matter in which there are illustrated preferred embodiments of the invention.

DESCRIPTION OF A PREFERRED EMBODIMENT

Figure 1:
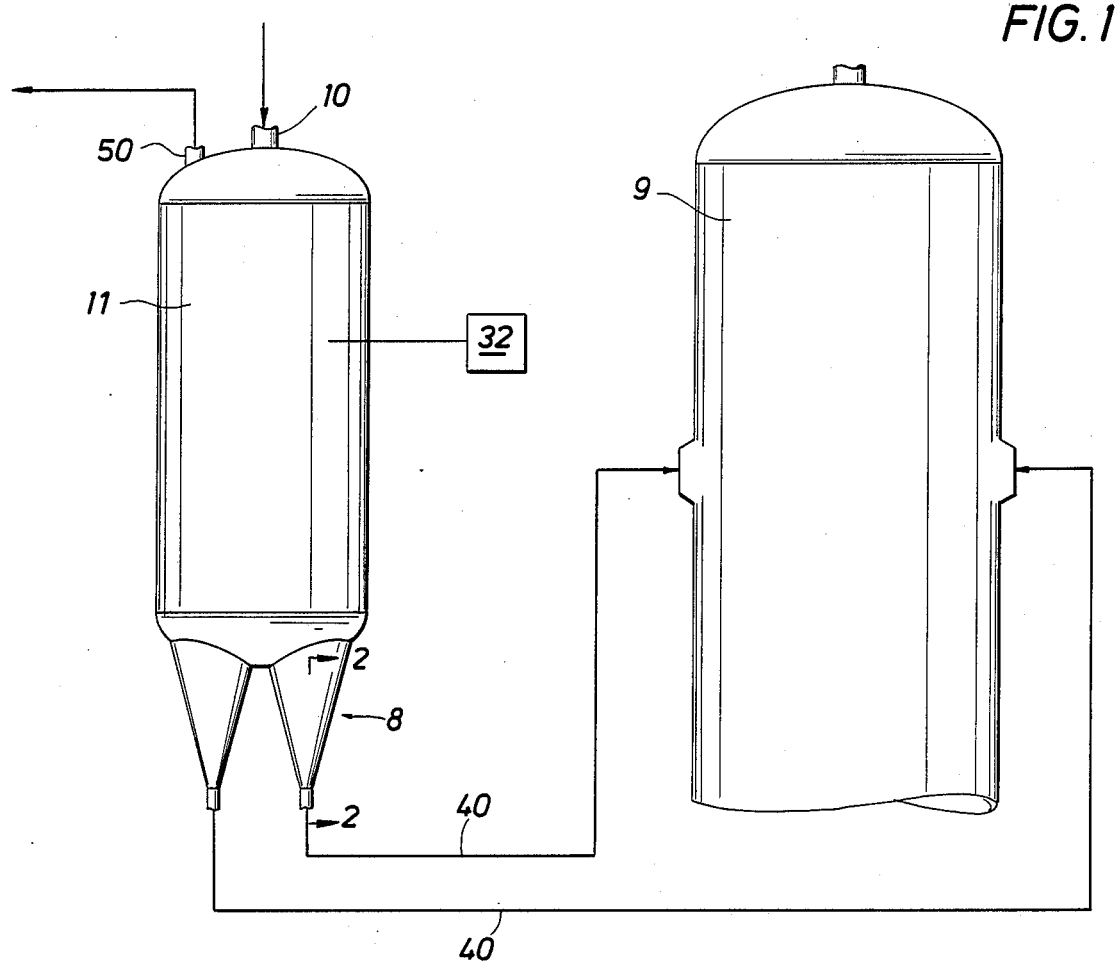
FIG. 1 illustrates an embodiment of this invention.

Generation of synthesis gas occurs by partially combusting carbonaceous fuel, such as coal, at relatively high temperatures in the range of 800–2000° C. and at a pressure range of from about 1–200 bar in the presence of oxygen or oxygen-containing gases in a gasifier. Steam, carbon monoxide, carbon dioxide and oxygen-containing gases including air, oxygen, enriched air, and oxygen are optionally diluted with nitrogen and/or other inert gases.

In the present invention, the fuel and gas mixture is discharged from a feed vessel apparatus, preferably having multiple outlets, each outlet being in communication with at least one burner associated with the gasifier. Typically, a gasifier will have burners in diametrically opposing positions. Generally, the burners have their discharge ends positioned to introduce the resulting flame and the agent of combustion into the gasifier.

Of particular importance in the manufacture of synthesis gas is the uniform manner in which the particulate fuel is introduced to the burners within the coal gasification reactor, hereinafter referred to as a gasifier. Fluctuations in the mass flow rate of coal being supplied to the burners of the gasifier are detrimental to a gasifier's performance. For example, such fluctuations can cause inefficient combustion of fuel within the gasifier and damaging heat fluxes to the burner face which could result in thermal stresses on the burner face. If the mass flow rate of the particulate fuel fluctuates, zones of underheating are generated next to zones of overheating in the gasifier. As a result, in the zones of underheating the fuel is not completely gasified and in zones of overheating the fuel is completely converted into less valuable products, viz. carbon dioxide and water vapor. Additionally, locally high temperatures in the gasifier could damage the refractory lining which is normally arranged at the inner surface of the gasifier wall.

Since the residence time of the coal within the reaction zone of the reactor is approximately 400 milliseconds or less, the coal mass flow rate should preferably be constant over periods of this order and preferably over shorter periods to maintain constant local conditions.

Various factors substantially affect the mass flow rate of the fuel being supplied to the burners. In particular, the discharging of the particulate fuel from a feed vessel apparatus and the pneumatic transporting by conduit of the fuel from the vessel to the gasifier affect the mass flow rate of fuel to the gasifier. Specifically, fuel and gas mixtures having densities ranging from about 50-800 kg/m$^3$ transported through a conduit having a diameter less than 150 mm experience significant pressure drop due to the summation of various contributions such as frictional losses, restrictions, curvatures, etc. within the conduit.

The present invention utilizes a vessel having downwardly- converging walls at the lower end thereof forming a portion made of porous material having at least one port at the apex for aerating the solid within the vessel so as to maintain a uniform mass flow rate of the solids and gas mixture discharged to a gasifier. In particular, areas located circumferentially about the outside of the porous material portion are isolated to form closed compartments. Gaseous fluids are injected into each compartment at selected pressure and rate to maintain a uniform mass flow rate of a particulate solids and gas mixture discharged to the receiving gasifier. Furthermore, the interchangeability of porous material portions having different permeabilities provide greater flexibility for operating the process under varying conditions, such as different coal types, coal moisture content, etc.

An advantage of the present invention is that maintaining a uniform mass flow rate of a particulate solids and gas mixture to a gasifier prevents zones of underheating and overheating within the gasifier from occurring.

A further advantage of the present invention is protecting the refractory lining within the gasifier due to preventing zones of underheating and overheating.

An additional advantage of the present invention is more efficient utilization of fuel in the production of synthesis gas.

Another advantage of the present invention is the capability to maintain high suspension densities, e.g. greater than 200 kg/m$^3$, in the transport line from the vessel to the gasifier thereby reducing the consumption of aeration and pneumatic transport gas and avoiding dilution of the synthesis gas produced in the gasifier which would make the synthesis gas a less valuable product.

Although the invention is described hereinafter primarily with reference to pulverized coal, the method and apparatus according to the invention are also suitable for reactive solids and other finely divided solid fuels which could be partially combusted, such as lignite, anthracite, bituminous, brown coal, soot, petroleum coke, and the like. The size of solid carbonaceous fuel is such that 90% by weight of the fuel has a size of smaller than No. 6 mesh (A.S.T.M.). Preferably, the size of solid carbonaceous fuel is such that 90 percent by weight of the fuel has a particle size smaller than 100 mesh (A.S.T.M.).

Additionally, the present invention can be used for both granular, pulverized, and powdered solids such as resins, catalysts, fly ash, and electrostatic precipitator fines.

Having thus generally described the apparatus and method of the present invention, as well as its numerous advantages over the art, the following is a more detailed description thereof, given in accordance with specific reference to the drawings. However, the drawing is of a process flow type in which auxiliary equipment, such as pumps, compressors, cleaning devices, etc. are not shown. All values are merely exemplary or calculated.

Figure 2:
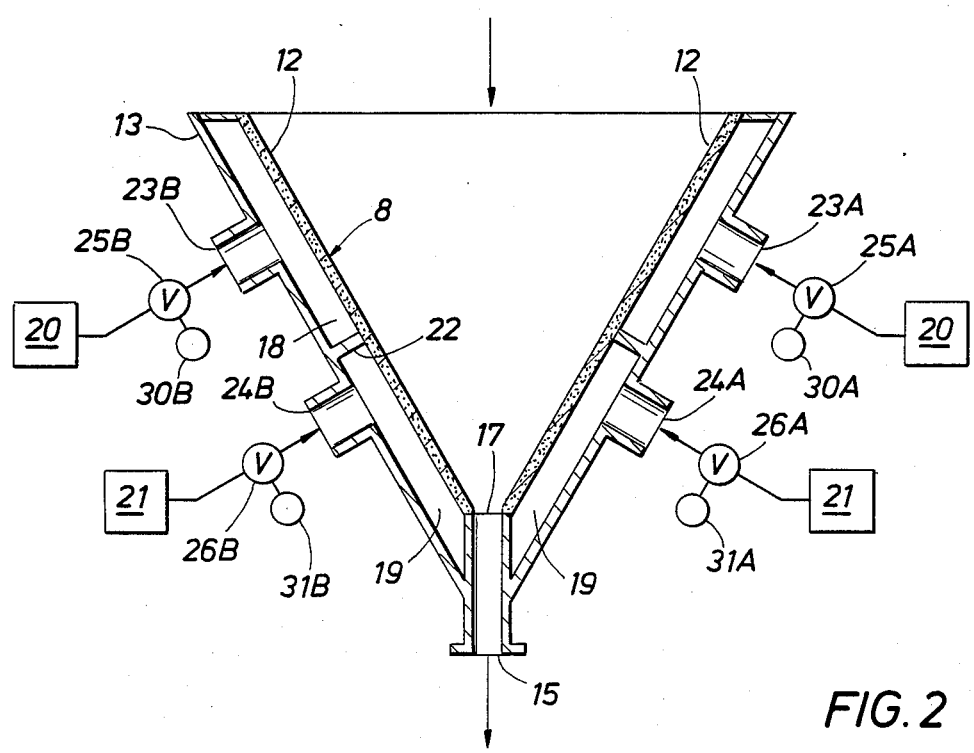
FIG. 2 is a cross-section of the preferred embodiment taken along line 2—2 of FIG. 1.

Referring to FIGS. 1 and 2, an apparatus for maintaining a uniform mass flow rate of a particulate solids and gas mixture discharged from a holding vessel apparatus, such as a feed hopper 11 operated at elevated pressures of 1-200 bars, via conduit 40 to a receiving reactor, such as a gasifier 9, generally includes means for introducing the mixture, such as an inlet port 10, into first containing means 8 having converging walls 12 having an included angle of less than about 150 degrees, preferably less than about 90 degrees, and converging toward at least one port 17 formed at the apex thereof for discharging the mixture therefrom. The walls 12 include at least a portion of porous material which may be metallic or nonmetallic, such as sintered stainless steel, woven stainless steel, or sintered ceramic, depending upon the operating conditions and type of coal used in the process. The porous material has a selected permeability and a maximum pore size of less than about 7 mm The porous material facilitates the uniform distribution of gaseous fluid injected from pressurized sources 20. 21 into first containing means 8 and prevents bridging of the particulate solids discharged from the first containing means via discharge port 17.

The pore size of the porous material of the walls 12 is based on, among other factors, the type of coal used. To allow greater operating flexibility to use various types of coal requiring differing pore sizes, the porous material portion of the first containing means 8 is preferably interchangeable with another containing means having a different permeability than the first containing means 8.

Furthermore, introduction of the gaseous fluid into the pores of the porous material of walls 12 imparts a pressure restriction to the gaseous fluid thus ensuring an even flow distribution of the fluid throughout the walls 12 of the first containing means 8. Similarly, the porous material serves to control the bulk density of the mixture within the first containing means 8 and the discharge rate of the mixture leaving the hopper 11 via port 17.

A jacket 13 positioned at the lower end of the first containing means is mounted to form a substantially enclosed space between the walls 12 of the first containing means 8 and the jacket 13. The jacket 13 has at least one outlet port 15 at the lower end thereof which is in axial alignment with the discharge port 17 of the first containing means 8 for discharging particles therefrom.

Means for isolating areas, preferably first and second areas 18, 19, respectively, located outside and circumferentially about substantially adjacent portions of the porous material of walls 12, such as a partition 22 within the substantially enclosed space between the jacket 13 and the porous material of walls 12, forms at least two substantially enclosed compartments. The jacket 13 includes means for selectively injecting gaseous fluid under pressure into first and second areas 18, 19, respectively, such as inlet ports 23A, 23B, and 24A, 24B, respectively, from pressurized fluid sources 20. 21 respectively. Although sources 20. 21 are shown as separate sources, it is recognized by those skilled in the art that gaseous fluid may be supplied from the same source.

The compartments formed within the substantially enclosed space between the walls 12 and the jacket 13 permit gaseous fluids, possibly having different densities, such as nitrogen or other inert gas and synthesis gas which is mainly carbon monoxide, hydrogen, and water, to be selectively injected into the compartments. The gas injected from source 20 into the first area 18 may be more, equal to, or less dense than the gas injected from source 21 into second area 19. Preferably, the gas injected into area 18 would be inert and the gas injected into area 19 would be synthesis gas. The gas injected into area 18 would preferentially flow upwards and could be vented at 50 to control the pressure in the feed hopper 11 whereas the gas injected into area 19 flows preferentially downward and is transported to the gasifier 9.

The flow rate and direction of the gaseous fluid, preferably nitrogen and synthesis gas, injected under pressure into the first and second areas 18, 19, respectively, are controlled at a rate sufficient to aerate the particulate solids in proximity to the portion of porous material of walls 12 but at a rate below that which would fluidize the particulate solids located above the porous material such as by using 25A, 25B, 26A, and 26B, respectively.

It is undesirable to inject the gases at a rate sufficient to fluidize the particles above the porous material, as is typically done in conventional systems, because it results in more inert gas diluting the synthesis gas produced in the gasifier 9 and thus yielding a less valuable product. Also, it increases fluctuations of the mass flow rate of solids discharged from the coal feed hopper 11.

Additionally, the flow rates of the gaseous fluid from sources 20, 21 should not exceed the terminal falling velocity of the solids contained within the feed hopper 11. Terminal falling velocity is defined as the velocity at which the drag forces on a solid particle due to the flow of gases upward equals the downward force on the particle due to gravity. If the flow rates of the gases exceed the terminal falling velocity, then the solids will be discharged via the vent 50 rather than the discharge port 17.

Furthermore, the slip velocity, i.e. the velocity of the gas from sources 20, 21 relative to the coal, should preferably be controlled at a rate which is below a minimum fluidization velocity of the particulate solids in feed hopper 11 above the porous portion, such as by using flowmeters 30A, 30B, 31A, and 31B, respectively. Gaseous fluids from sources 20, 21 are injected at a selected rate which is at least substantially equal to the slip velocity of the gaseous fluids but below the minimum fluidization velocity of the particulate solids in the hopper 11 above the porous portion, say at least 2 mm/s for a hopper having a diameter of about 1 meter.

Preferably, the flow rates of these gases from sources 20 and 21 are independently controllable which permits the separate control of the amount of gas flowing upward and the amount of gas flowing downward relative to the flow of the coal.

For example, for a uniform mass flow rate of particulate solids and gas mixture of 2000 kg/hr having a suspension density of 450 kg/m$^3$ discharged from the feed hopper 11, the rate of injecting nitrogen in the first area would be approximately 100 kg/hr. Should this rate be exceeded then the suspension density would be less than 450 kg/m$^3$ and the synthesis gas produced in the gasifier 9 would be diluted by the nitrogen from source 20. Additionally, should this rate be somewhat less than the selected rate then the suspension density would be substantially higher than 450 kg/m$^3$. Depending on the material and operating conditions, this situation could lead to less than stable flow.

Furthermore, the gaseous fluid may be injected in various directions and elevations to control the pressure and velocity profile which exists at the discharge port 17. Depending on the Physical Properties of the particles being transported, it may be necessary to have more than two compartments or to inject gas above the compartmented region.

This selective injection provides for separate control of the mixture density within the feed hopper 11 and the discharge density of the mixture leaving the hopper 11 via outlet port 15 As a result, the discharge port 15 of the hopper 11 is much smaller than conventional technologies for suspension densities of 200-500 kg/m$^3$ preferred in the present invention.

The diameter of the discharge port 17 in the present invention is about 4 mm to at least substantially about 150 mm for a solids and gas mixture having a suspension density of about 200-500 kg/m$^3$. This diameter is larger than the maximum bridging diameter of the aerated particulate solids to prevent bridging of the solids as they exit the discharge port 17. Conventional coal feed systems using gravity flow of solids assisted by aeration to break up bridging typically have a suspension density of less than 200 kg/m$^3$ at the discharge outlet of the feed hopper 11 and a corresponding feed vessel apparatus discharge port diameter of greater than 150 mm. Diameters greater than 150 mm for a given mass flow rate used in the present invention are not desirable because either the velocity or suspension density would fall below the desired limits thus resulting in fluctuations of the mass flow rate of the coal and gas mixture to the gasifier 9.

Additionally, the smaller discharge diameter of the present invention in conjunction with the compartmented injection of gaseous fluids acts like a fluidic valve to control the particulate discharge rate and thereby eliminates the need for troublesome valves in transport hardware between the discharge of the hopper 11 and the gasifier 9.

Furthermore, the present invention may be provided with means for venting gas from the upper end of the hopper 11, say via port 50, for the purpose of maintaining an upward flow of gas through the solids in the feed hopper 11 of approximately 2mm/sec and thereby eliminate local bridging of the solids and provide smoother flow to the discharge port 17.

Figure 3:
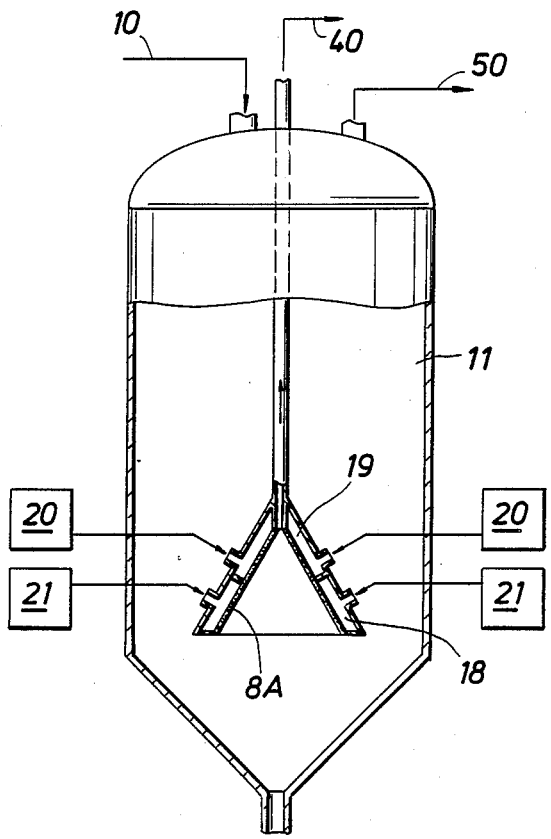
FIG. 3 is an alternate embodiment of the present invention.
Figure 4:
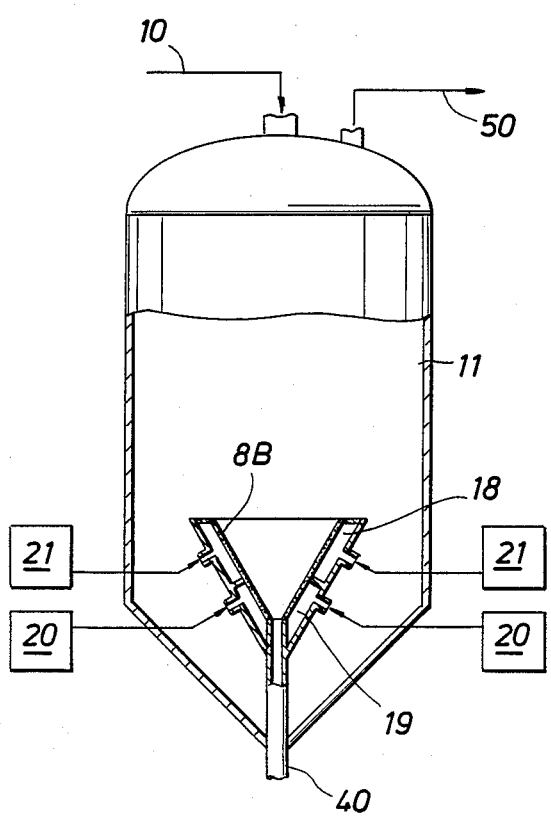
FIG. 4 is another embodiment of the present invention.

Alternatively, the present invention may incorporate first containing means 8A and 8B located inside the feed hopper 11 rather than at the lower end of the hopper 11 as shown in FIGS. 3 and 4, respectively. An advantage to the embodiment shown in FIG. 3 is that the transport line 40 from the feed hopper 11 to the gasifier 9 would be shorter since the burners of the gasifier are located at an elevation above the gas injection device 19, for example of about 50 meter. A shorter transport line 40 provides more uniform flow of the coal to the burners of the gasifier 9.

Another advantage of the alternate embodiments shown in FIGS. 3 and 4, for the multiple outlet feed hopper 11, is that the geometry of the hopper 11 is substantially simplified as a result of the first containing means 8A and 8B being located inside the hopper 11.

It would be recognized by one skilled in the art that references made with respect to the direction of flow of the gases and coal particles within the first containing means 8 of the embodiment described in FIG. 1 would be reversed when referring to the first containing means 8A shown in FIG. 3 since the first containing means 8A is inverted with respect to the first containing means 8 shown in FIG. 1.

The foregoing description of the invention is merely intended to be explanatory thereof, and various changes in the details of the described method and apparatus may be within the scope of the appended claims without departing from the spirit of the invention.

What is claimed is:

1. A method for maintaining a uniform mass flow rate of a particulate solids and gas mixture discharged from a holding vessel apparatus to a receiving reactor, said method comprising:
   introducing said mixture into a first containing means having converging walls forming a portion made of porous material having at least one port formed at the apex thereof for discharging said mixture therefrom;
   isolating areas outside the porous material portion of said first containing means to form at least two substantially closed compartments;
   selectively injecting gaseous fluid under pressure into each of said compartments;
   independently controlling the flow rate and direction of said gaseous fluid under pressure at a rate sufficient to aerate the particulate solids in proximity to said portion of porous material but at a rate below that which would fluidize the particulate solids located above said porous material; and
   discharging said particulate solids and gas mixture from said first containing means through a conduit having a diameter in the range of about 4–150 millimeters and wherein the suspension density of said solids and gas mixture is in the range of about 50–800 kilograms per cubic meter.

2. The method of claim 1 wherein said isolating includes the steps of:
   isolating a first area located circumferentially about a portion of the porous material; and
   isolating a second area located circumferentially about a substantially adjacent portion of said porous material and below said first area.

3. The method of claim 1 wherein said selectively injecting gaseous fluid includes providing gaseous fluids having different densities.

4. The method of claim 3 wherein said injecting said gaseous fluids includes the steps of:
   injecting a first gaseous fluid having a selected density into said first area; and
   injecting a second gaseous fluid having a density greater than said first gaseous fluid into said second area.

5. The method of claim 4 including injecting said first gaseous fluid at a selected rate not to exceed the terminal falling velocity of the solids within said holding vessel apparatus.

6. The method of claim 4 including injecting said second gaseous fluid at a selected rate not to exceed the terminal falling velocity of the solids within said holding vessel apparatus.

7. The method of claim 4 including controlling the slip velocity of said gaseous fluid under pressure at a rate below a minimum fluidization velocity of said particulate solids within said holding vessel apparatus above the porous portion thereof.

8. The method of claim 3 wherein said injecting gaseous fluids includes the steps of:
   injecting a first gaseous fluid having a selected density into said first area; and
   injecting a second gaseous fluid having a density less than said first gaseous fluid into said second area.

9. The method of claim 8 including injecting said first gaseous fluid at a selected rate not to exceed the terminal falling velocity of the solids within said holding vessel apparatus.

10. The method of claim 8 including injecting said second gaseous fluid t a selected rate not to exceed the terminal falling velocity of the solids within said holding vessel apparatus.

11. The method of claim 8 including controlling the slip velocity of said gaseous fluid under pressure at a rate below a minimum fluidization velocity of said particulate solids within said holding vessel apparatus above the porous portion thereof.

12. An apparatus for maintaining a uniform mass flow rate of particulate solids and gas mixture discharged from a holding vessel apparatus to a receiving reactor, said apparatus comprising:
   means for introducing said mixture into a first containing means having converging walls forming a portion made of porous material and having at least one port formed at the apex thereof for discharging said mixture therefrom;
   means for isolating areas outside the porous material portion of said first containing means to form at least two substantially closed compartments;
   means for selectively injecting gaseous fluid under pressure into each of said compartments;
   means for independently controlling the flow rate and direction of said gaseous fluid under pressure at a rate sufficient to aerate the particulate solids in proximity to said portion of porous material but at a rate below that which would fluidize the particulate solids located above said porous material; and
   conduit means for discharging said particulate solids and gas mixture from said first containing means, said conduit having a diameter in the range of about 4–150 millimeters and wherein the suspension density of said solids and gas mixture is in the range of about 50–800 kilograms per cubic meter.

13. The apparatus of claim 12 wherein said means for isolating includes:
   means for isolating a first area located circumferentially about a portion of the porous material; and
   means for isolating a second area located circumferentially about a substantially adjacent portion of said porous material and below said first area.

14. The apparatus of claim 12 wherein said gaseous fluid includes more than one component, said components being of different densities.

15. The apparatus of claim 14 wherein said means for injecting said gaseous fluids includes:
   means for injecting a first gaseous fluid having a selected density into said first area; and
   means for injecting a second gaseous fluid having a density greater than said first gaseous fluid into said second area.

16. The apparatus of claim 14 wherein said means for injecting gaseous fluids includes:
   means for injecting a first gaseous fluid having a selected density into said first area; and
   means for injecting a second gaseous fluid having a density less than said first gaseous fluid into said second area.

17. The apparatus of claim 15 including means for injecting said first gaseous fluid at a selected rate not to exceed the terminal falling velocity of the solids within said holding vessel apparatus.

18. The method of claim 15 including means for injecting said second gaseous fluid at a selected rate not to exceed the terminal falling velocity of the solids within said holding vessel apparatus.

19. The apparatus of claim 15 or 16 including means for controlling the slip velocity of said gaseous fluid under pressure at a rate below a minimum fluidization velocity of said particulate solids within said holding vessel apparatus above the porous portion thereof.

20. The apparatus of claim 16 including means for injecting said first gaseous fluid at a selected rate not to exceed the terminal falling velocity of the solids within said holding vessel apparatus.

21. The method of claim 16 including means for injecting said second gaseous fluid at a selected rate not to exceed the terminal falling velocity of the solids within said holding vessel apparatus.

22. The apparatus of claim 16 including means for controlling the slip velocity of said gaseous fluid under pressure at a rate below a minimum fluidization velocity of said particulate solids within said holding vessel apparatus above the porous portion thereof.

* * * * *